United States Patent
Drouillard et al.

[19]

[11] Patent Number: 6,050,467
[45] Date of Patent: Apr. 18, 2000

[54] ARTICLE CARRIER ASSEMBLY HAVING A CROSS RAIL ASSEMBLY ADJUSTABLE WITHIN A RANGE OF INFINITE OPERATING POSITIONS

[75] Inventors: James R. Drouillard, Lake Orion, Mich.; John D. Michrina, Irvine, Calif.; Jeffrey L. Roberts, Orion, Mich.

[73] Assignee: Decoma International, Inc., Concord, Canada

[21] Appl. No.: 09/054,495

[22] Filed: Apr. 3, 1998

Related U.S. Application Data

[60] Provisional application No. 60/042,673, Apr. 3, 1997.

[51] Int. Cl.[7] .................................................. B60R 9/04
[52] U.S. Cl. ......................... 224/321; 224/309; 410/137
[58] Field of Search ................... 224/309, 321, 224/322, 329, 331; 410/137, 138, 139, 144

[56] References Cited

U.S. PATENT DOCUMENTS

| | | |
|---|---|---|
| 2,888,178 | 5/1959 | Olsen . |
| 4,156,497 | 5/1979 | Bott . |
| 4,182,471 | 1/1980 | Bott . |
| 4,294,388 | 10/1981 | Wunstel . |
| 4,295,587 | 10/1981 | Bott . |
| 4,364,500 | 12/1982 | Bott . |
| 4,382,532 | 5/1983 | Pflugfelder ............................. 224/331 |
| 4,431,123 | 2/1984 | Bott ....................................... 224/321 |
| 4,460,116 | 7/1984 | Bott . |
| 4,473,178 | 9/1984 | Bott . |
| 4,487,348 | 12/1984 | Mareydt . |
| 4,588,117 | 5/1986 | Bott . |
| 4,684,048 | 8/1987 | Bott . |
| 4,705,198 | 11/1987 | Kamaya . |
| 4,972,983 | 11/1990 | Bott . |
| 5,190,198 | 3/1993 | Cucheran . |
| 5,205,453 | 4/1993 | Pudney et al. . |
| 5,226,570 | 7/1993 | Pedrini . |
| 5,385,285 | 1/1995 | Cucheran et al. . |
| 5,397,042 | 3/1995 | Pedrini . |
| 5,423,465 | 6/1995 | Kauka et al. . |
| 5,470,003 | 11/1995 | Cucheran . |
| 5,472,256 | 12/1995 | Tucker . |
| 5,511,708 | 4/1996 | Cronce et al. . |
| 5,573,161 | 11/1996 | Stapleton ............................... 224/321 |
| 5,577,649 | 11/1996 | Lee Jr. et al. . |
| 5,577,650 | 11/1996 | Stapleton . |
| 5,579,970 | 12/1996 | Cucheran et al. . |
| 5,588,572 | 12/1996 | Cronce et al. . |
| 5,622,298 | 4/1997 | Cucheran et al. . |
| 5,657,914 | 8/1997 | Stapleton . |
| 5,732,863 | 3/1998 | Stapleton ............................... 224/321 |
| 5,758,810 | 6/1998 | Stapleton ............................... 224/321 |
| 5,794,826 | 8/1998 | Cronce et al. ......................... 224/321 |

FOREIGN PATENT DOCUMENTS

94/10007  5/1994  WIPO .

*Primary Examiner*—Allan N. Shoap
*Assistant Examiner*—Gregory M. Vidovich
*Attorney, Agent, or Firm*—Pillsbury Madison Sutro LLP

[57] ABSTRACT

The present invention is an article carrier assembly for mounting on an exterior surface of a motor vehicle. The article carrier comprise a pair of elongated side rails constructed and arranged to be mounted on an exterior surface of the motor vehicle. The side rails extend generally parallel to one another in a spaced apart relation. Each of the side rails has a longitudinally extending deformable gripping structure. An elongated adjustable cross rail assembly is constructed and arranged to be mounted transversely between and releasably lockable along the side rails in an infinite range of operating positions. The cross rail assembly has rail locking structures mounted on opposite ends thereof for selectively engaging the gripping structure. An actuator assembly gangs the rail locking structures together for cooperative movement thereof between locked positions wherein the rail locking structures engage and compress the gripping structure to lock the cross rail assembly in one of the infinite range of operating positions and disengage positions permitting longitudinal travel of the cross rail assembly along the side rails.

10 Claims, 2 Drawing Sheets

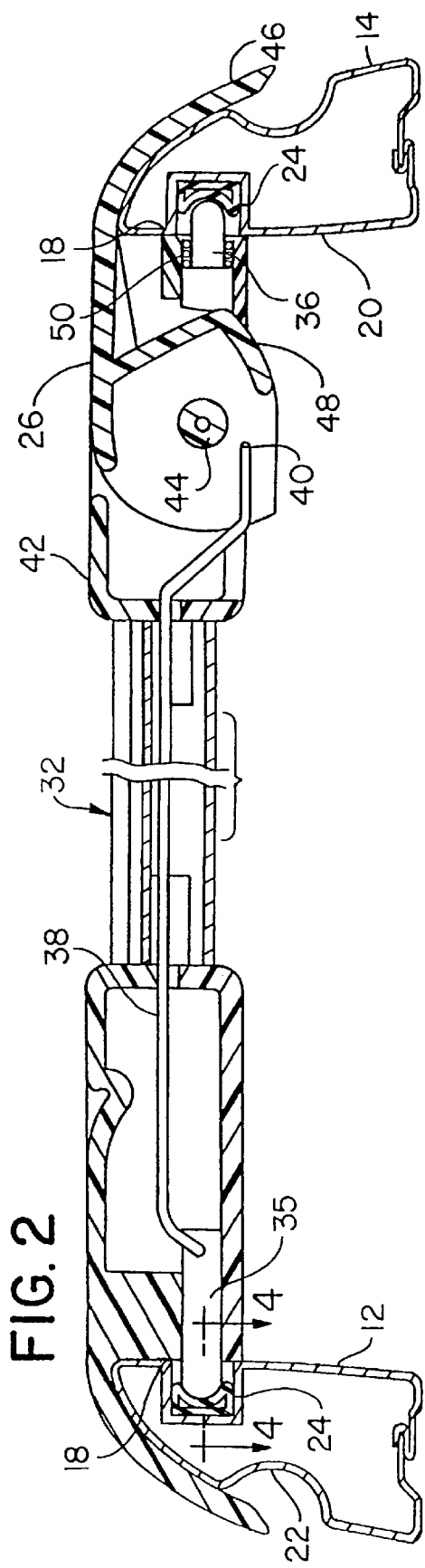
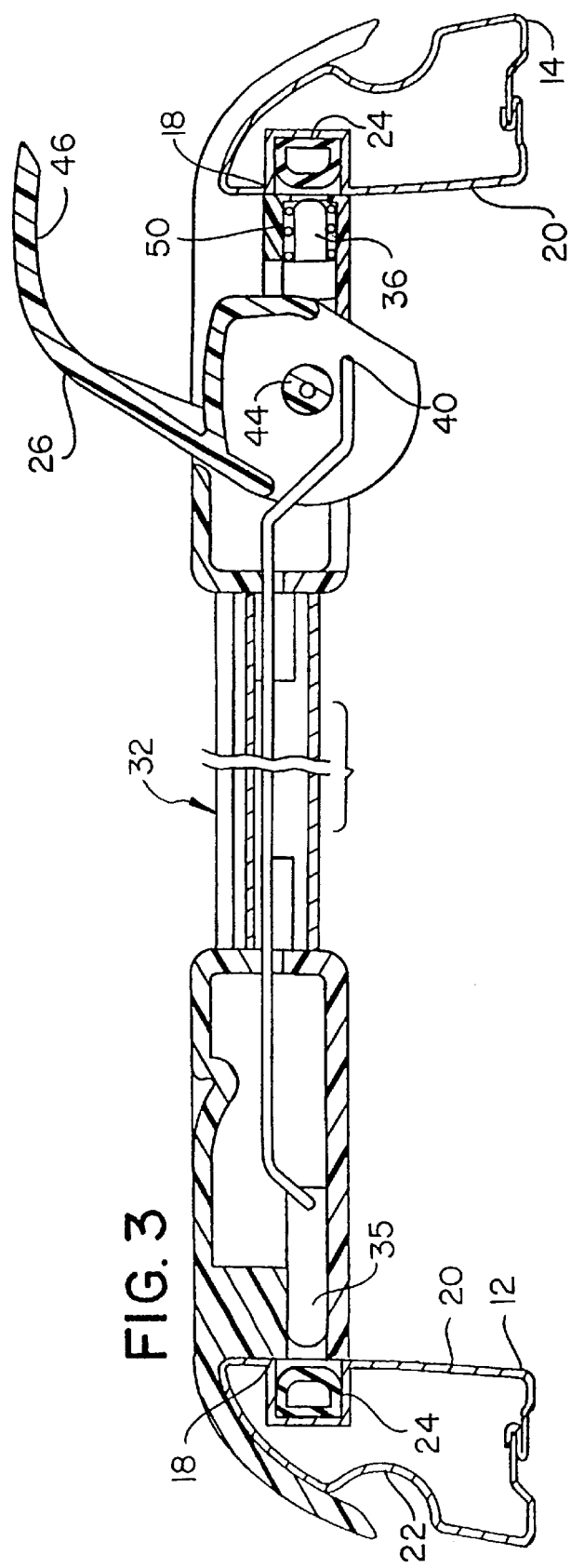

ARTICLE CARRIER ASSEMBLY HAVING A CROSS RAIL ASSEMBLY ADJUSTABLE WITHIN A RANGE OF INFINITE OPERATING POSITIONS

The present application claims priority from U.S. Provisional Patent Application of Drouillard et al., Ser. No. 60/042,673, filed Apr. 3, 1997.

The present invention relates to article carrier assemblies used to transport cargo on the exterior of motor vehicles.

Article carrier assemblies are well known for use in transporting cargo on an upwardly facing exterior surface of a motor vehicle. Typically, conventional article carrier assemblies comprise a pair of side rail structures having cross rail assemblies mounted there across. Cargo can be laid across or tied down to the cross rail assemblies during transportation.

Oftentimes, it is desirable to adjust the position of one or more of the cross rail assemblies in order to accommodate cargo of varying sizes. It has been heretofore known in the art to construct article carrier assemblies in which one or more of the cross rail assemblies can be adjusted longitudinally with respect to the side rail structures. These known adjustable cross rail assemblies, however, can only be moved through a range of discrete, predetermined operating positions. Generally, these discrete, predetermined operating positions are defined by openings formed in each of the side rail structures. Locking pins on the cross rail assembly are inserted into these openings to lock the cross rail assembly in place and retracted to permit adjusting movement.

It is oftentimes desirable to adjust the cross rail assembly without the need to align each locking pin with corresponding openings on the side rail structures. It is also desirable to be able to adjust the cross rail assembly to any position along the side rail structures without being limited to those discrete, predetermined positions defined by the openings conventionally found on the side rail structures.

It is therefore an object of the present invention to provide an article carrier assembly which meets the above-described needs. The present invention is an article carrier assembly for mounting on an exterior surface of a motor vehicle. The article carrier comprise a pair of elongated side rails constructed and arranged to be mounted on an exterior surface of the motor vehicle. The side rails extend generally parallel to one another in a spaced apart relation. Each of the side rails has a longitudinally extending deformable gripping structure. An elongated adjustable cross rail assembly is constructed and arranged to be mounted transversely between and releasably lockable along the side rails in an infinite range of operating positions. The cross rail assembly has rail locking structures mounted on opposite ends thereof for selectively engaging the gripping structure. An actuator assembly gangs the rail locking structures together for cooperative movement thereof between locked positions wherein the rail locking structures engage and compress the gripping structure to lock the cross rail assembly in one of the infinite range of operating positions and disengage positions permitting longitudinal travel of the cross rail assembly along the side rails.

BRIEF DESCRIPTION OF THE DRAWINGS

FIG. 2 is a front, sectional view of a cross rail assembly and side rail structures of the article carrier assembly of FIG. 1, shown in a locked position with respect to the side rails;

FIG. 3 is view similar to FIG. 2, showing the cross rail assembly in an unlocked position with respect to the roof rail structures.

DETAILED DESCRIPTION OF THE PREFERRED EMBODIMENT

Figure 1:
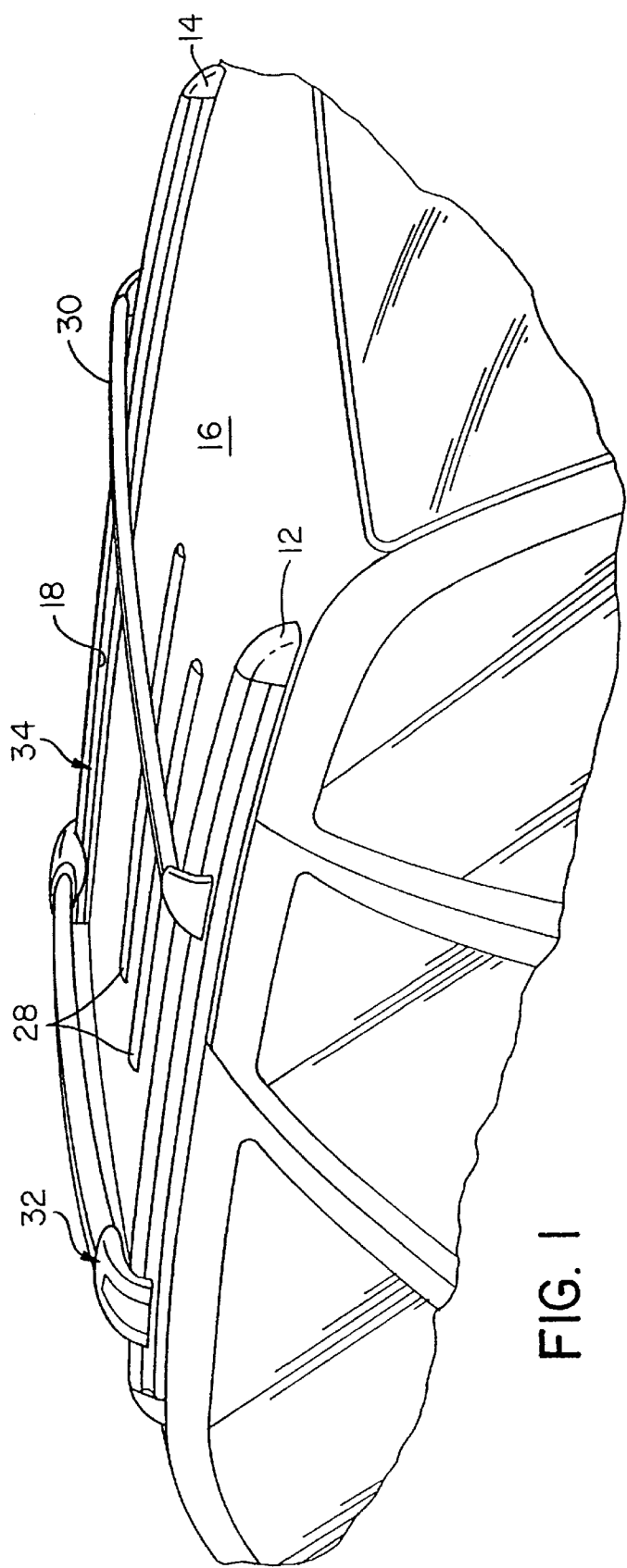
FIG. 1 is a perspective view of an upper roof structure of a motor vehicle having an article carrier assembly embodying the principles of the present invention mounted thereon.

Referring to the drawings, an article carrier assembly is shown, generally indicated at 10, which embodies the principles of the present invention.

As shown in FIG. 1, the article carrier assembly 10 includes a pair of elongated side rails 12 and 14 mounted in fixed, spaced relation on an exterior body surface 16 of a vehicle and extending longitudinally of the vehicle. In the illustrated embodiment, the article carrier assembly 10 is disposed on a roof panel of the vehicle. It can be appreciated, however, that the article carrier assembly 10 can be mounted on the outer surface of a trunk of the vehicle or to the side rails of a pick-up truck box.

Each of the side rails 12 and 14 is preferably roll formed and of generally hollow configuration. Each side rail structure 12 and 14 includes an elongated groove 18 extending generally the length of inner side wall 20. The side rail structures 12, 14 are generally identical and each also includes a longitudinally extending clearance groove 22 on an outer surface thereof which provides a clearance for manually grasping actuating structure in the form of a handle 26 to move the handle member from a locked position to an unlocked position, as will become more apparent below. Other manually engageable members may be used in place of the handle 26, but the handle 26 is preferred for its ease of operation.

Each of the grooves 18 includes deformable gripping structure in the form of a resilient structure 24 mounted therein which has a generally D-shaped cross-section. The resilient structure 24 is preferably composed of a rubber material, such as, for example, EPDM or other similar weatherstrip material which may be deformed and which will return to its undeformed state once stress is removed from the material. The resilient structure 24 may be attached to the groove 18 by adhesive or any other known fastening method.

The side rails 12 and 14 may be formed of any suitable material for supporting articles, such as metal, plastic and combinations thereof. Side rails 12 and 14 are fixed to the vehicle body surface 16 by fasteners, adhesive or the like.

As shown in FIG. 1, a plurality of slats 28 are spaced between the side rails 12 and 14. The slats 28 are fixed to the exterior body surface 16 in a manner similar to that of the side rails 12 and 14. The cargo may be placed on the slats 28 and secured by tying to a cross rail assembly. Thus, the slats 28 provide protection to the exterior body surface 16 of the vehicle.

In the illustrated embodiment, the article carrier assembly includes at least one conventional, stationary cross rail assembly 30 and at least one adjustable cross rail assembly 32 extending between the side rails 12 and 14. With reference to FIG. 1, the adjustable cross rail assembly 32 is movable longitudinally with respect to the side rail structures 12, 14 within a range of infinite operating positions while the stationary cross rail 30 is fixedly mounted, by screws or the like between the side rails 12 and 14. It can be appreciated that any number of cross rails and/or cross rail assemblies may be provided. Further, the stationary cross rail 30 may be replaced with a movable cross rail assembly 32 such that both cross rail assemblies are adjustable. The cross rail assembly 30 is formed of any suitable material such as metal, plastic or combinations thereof. The adjustable cross rail assembly 32 is preferably formed from light weight steel or metal or from molded plastic so as to be capable of being lifted from one side of the vehicle, as will be explained in more detail below.

The adjustable cross rail assembly 32 is of the type disclosed in pending U.S. Patent Application of Kuntze et al. entitled "Article Carrier Assembly Having a Cross Rail Assembly Longitudinally Adjustable from One Side of a Motor Vehicle" filed even date herewith, the disclosure of which is incorporated into the present application by reference. The adjustable cross rail assembly 32 may also be of any conventional construction and is not limited to those which are operated from one side of the vehicle.

As disclosed in the above-mentioned co-pending patent application and with reference to FIG. 2, the cross rail assembly 32 includes an actuator in the form of a handle 26 and side rail locking structures in the form of pins 35 and 36 disposed on opposing ends thereof and ganged together for cooperative movement. The pin 35 opposite the handle 26 is operatively connected to the handle 26 via a pushing member in the form of a rod 38. One end of the rod 38 is pivotally coupled to the handle 26 at pivot 40 while the other end of the rod is coupled to the pin 35 opposite the handle 26. In the broadest aspects of the invention, the rod 38 may be considered an extension of the pin 35 opposite the handle 26. The pins 35, 36 are preferably cylindrical and constructed and arranged to be deformably received by the resilient structures 24 in the grooves 18 of the side rail 12, 14. Together, the pins, 36, 36, and the rod 38, and the handle 26 comprise an actuator assembly.

The handle 26 is pivotally coupled to a housing 42 at pivot 44. The handle 26 includes a gripping portion 46 and a camming member having a cam surface 48, also referred to as a side rail locking structure engaging portion, the function of which will become apparent below. The side rail locking structure 36 adjacent the handle member 26 is disposed adjacent the cam surface 48 of the handle 26. The pin 36 is biased by a biasing element in the form of a spring 50 in a direction away from side rail 14. In the illustrated embodiment, the rod 38 is a rigid steel rod and the pins 35, 36 are also rigid and made of any suitable material such as steel, metal or rigid plastic. The pins 35 and 36 and grooves 18 are configured so that the pins 35, 36 may be deformably received by the resilient structure 24 in the grooves, thereby permitting the adjustable cross rail assembly 32 to be mounted with the handle 26 located at either the passenger side or driver's side of the vehicle.

With reference to FIG. 3, when the handle 26 moves to a locking position thereof, the cam surface 48 of the handle 26 engages the pin 36 adjacent the handle 26 and moves it generally linearly against the bias of the spring 50 to an engaged position such that the pin 36 compresses the resilient structure 24 in groove 18 of the side rail 14 and is deformably received thereby. The movement of the handle 26 simultaneously causes the rod 38 to push the pin 35 opposite the handle 26 generally linearly outwardly to compress the resilient structure 24 in groove 18 in the side rail 12 so that the pin 35 is deformably received thereby. Thus, the pins 35 and 36 are moved to engaged positions locking the adjustable cross rail assembly 32 with respect to the side rails 12 and 14 to thereby prevent longitudinal adjusting movement of the cross rail assembly 32 within the range of infinite operating positions.

Figure 4:
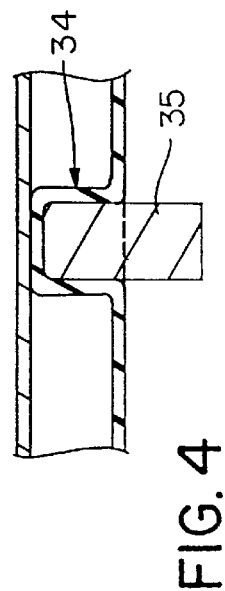
FIG. 4 is a sectional view taken along the line 4—4 in FIG. 2.

As best shown, in FIG. 4, the pin 35 engages and compresses the resilient structure 24 such that it is deformably received to thereby define deformed portions in the resilient structure 24. The deformed portions are bounded by undeformed portions on opposite sides thereof in the longitudinal directions of the side rail structure 12. The same deformation takes place between the other pin 36 and the resilient structure 24 in the other side rail 14. The end portions of the pins 35, 36 are generally surrounded by the deformed portions of the resilient structure 24 and have the undeformed portions disposed on opposite sides thereof in the longitudinal directions of the side rails 12, 14 when in the respective engaged positions thereof. In this position, the undeformed portions of the resilient structure 24 provide resistance to movement of the pins 35, 36 in the longitudinal direction of the side rails 12, 14 to thereby prevent longitudinal adjusting movement of the cross rail assembly 34 with respect to the side rails 12, 14 within the range of infinite operating positions.

When the handle 26 is pivoted upwardly as in FIG. 3, the pins 35 and 36 retract to disengaged positions and are moved out of engagement with the resilient structure 24 in the side rails 12 and 14, placing the cross rail assembly 32 in an unlocked condition to thereby permit longitudinal adjusting movement of the cross rail assembly 32 within the range of infinite operating positions. Thus, the resilient structures 24 resiliently return to their original, uncompressed D-shaped configuration, as shown in FIG. 3. The adjustable cross rail assembly 32 can then be grasped by an operator standing on one side of the vehicle and moved to any desired position with respect to the side rails 12 and 14 within the range of infinite operating positions.

Once the desired location is selected, the handle 26 is pivoted downwardly to move the pins 35 and 36 to the respective engaged positions thereof. Again, extension of the pins deforms and compresses each D-shaped resilient structure 24 as shown FIGS. 2, thus, defining a cup-shaped member generally surrounding an end portion of an associated pin 35 or 36 (FIG. 4). In such a position, the resilient structure 24 limits upward movement of the cross rail assembly 32 and movement thereof in the longitudinal direction of the vehicle within the range of infinite operating positions.

As noted above, the resilient structure is such that once the handle 26 is pivoted upwardly moving the pins 35 and 36 to the respective disengaged positions thereof, the resilient structure 24 will return to its D-shaped configuration and will not take a positive set.

It can be appreciated that, although, in the illustrated embodiment, the actuator structure is of the pivoting type upon which pivotal movement moves side rail locking structures generally linearly into engagement with the resilient material, the actuating structure can be of any type which causes movement of side rail locking structures so as to engage with, resilient material on the side rail structures. Thus, the actuating structure may be of the type disclosed in pending U.S. Patent Application of Reichenberger et al. entitled "Article Carrier Assembly Having a Cross Rail Assembly with a Turnable Locking Mechanism", filed even date herewith. The Reichenberger application discloses a rod with threaded end portions and rail locking structures threadingly engaged on the threaded end portions. Turning or rotation of the rod causes the locking structures to move towards and away from one another between unlocked and locked positions. Thus, the side rail locking structures may engage with the resilient materials to lock the cross rail assembly with respect to the side rail structures.

It can be seen that the article carrier assembly of the present invention provides an effective means of moving and then locking a cross rail assembly in any one of a range of infinite operating positions along the side rail structures of the article carrier assembly.

It will thus be seen that the objects of this invention have been fully and effectively accomplished.

It will be realized, however, that the foregoing preferred specific embodiment has been shown for the purpose of illustrating the functional and structural principles of the present invention and is subject to change without departure from such principles. Therefore, this invention includes all modifications encompassed within the spirit and scope of the following claims.

What is claimed is:

1. An article carrier assembly for mounting on an exterior surface of a motor vehicle, said article comprising:

a pair of elongated side rails constructed and arranged to be mounted on an exterior surface of the motor vehicle, said side rails extending generally parallel to one another in a spaced apart relation, each of said side rails having opposing longitudinal ends, a longitudinally extending groove, and a longitudinally extending resiliently deformable gripping structure disposed in said groove; and an elongated adjustable cross rail assembly constructed and arranged to be mounted transversely between and releasably lockable along said side rails in an infinite range of operating positions between the opposing longitudinal ends of said side rails, said cross rail assembly having rail locking structures mounted on opposite ends thereof for selectively engaging a respective one of said gripping structures, and an actuator assembly ganging said rail locking structures together for cooperative movement thereof between locked positions wherein the rail locking structures engage and compress the gripping structures to lock said cross rail assembly in one of said infinite range of operating positions and unlocked positions wherein the rail locking structures disengage the gripping structures to permit longitudinal travel of said cross rail assembly along said side rails.

2. An article carrier assembly according to claim 1 wherein said rail locking structures of said adjustable cross rail assembly engage and compress said deformable gripping structures of said side rails when in the respective locked positions thereof such that said rail locking structures are deformably received by said deformable gripping structures to thereby define deformed portions in said deformable gripping structures, said deformed portions of said deformable gripping structures being bound on opposite sides thereof in longitudinal directions of said rails by undeformed portions of said deformable gripping structures, end portions of said rail locking structures being surrounded by said deformed portions of said deformable gripping structures and having said undeformed portions disposed on opposite sides thereof in the longitudinal directions of said side rails when said rail locking structures are in the respective locked positions thereof such that said undeformed portions of said deformable gripping structures provide resistance to movement of said rail locking structures in the longitudinal directions of said side rails to thereby lock said adjustable cross rail assembly in one of said range of infinite operating positions.

3. The article carrier assembly according to claim 1 wherein said actuator assembly includes a handle having a rail locking structure engaging portion constructed and arranged such that (1) moving said handle from a locked position thereof to an unlocked position thereof moves the side rail locking structure near said handle into the unlocked position thereof and (2) moving said handle from the unlocked position thereof to the locked position thereof moves said rail locking structure near said handle to the locked position thereof;

said actuator assembly further comprising a rod constructed and arranged such that (1) moving said handle from the locked position thereof to the unlocked position thereof pushes the rail locking structure distal said handle to the unlocked position thereof and (2) moving said handle from the unlocked position thereof to the locked position thereof moves said rail locking structure distal said handle to the locked position thereof.

4. The article carrier assembly according to claim 1 wherein said gripping structures in said grooves on said side rail structures comprise D-shaped resilient members disposed in said grooves of said side rails, said D-shaped resilient members being configured such that rounded sides of said D-shaped resilient members deformably receive said rail locking structures in the respective locked positions thereof to thereby lock said adjustable cross rail assembly in one of said range of infinite operating positions.

5. The article carrier assembly according to claim 1 further comprising a stationary cross rail assembly constructed and arranged to be mounted transversely with respect to said side rails.

6. The article carrier assembly according to claim 1 wherein said grooves extending longitudinally along said side rails are formed on surfaces of said side rails which face inwardly toward one another when said side rails are mounted on the exterior surface of the motor vehicle.

7. The article carrier assembly according to claim 3 wherein said rail locking structure engaging portion is a camming surface on a camming member formed integrally with said handle.

8. The article carrier assembly according to claim 7 wherein said rod is pivotally connected to said camming member.

9. The article carrier assembly according to claim 3 wherein said adjustable cross rail assembly has flanges disposed on the opposing ends thereof, said flanges having downwardly facing surfaces configured to engage upwardly facing surfaces of said side rails when said adjustable cross rail assembly is mounted transversely between said side rails in one of said range of infinite operating positions.

10. The article carrier assembly according to claim 3 wherein said gripping structures in said grooves on said side rails comprise D-shaped resilient members disposed in said grooves of said side rails, said D-shaped resilient members being configured such that rounded sides of said D-shaped resilient members deformably receive said rail locking structures in the respective locked positions thereof to thereby lock said adjustable cross rail assembly in one said range of infinite operating positions.

* * * * *